(12) United States Patent
Plath

(10) Patent No.: US 10,473,198 B2
(45) Date of Patent: Nov. 12, 2019

(54) DEVICE FOR FORCE TRANSMISSION

(71) Applicant: KKD GETRIEBEBAU UG, Weissach (DE)

(72) Inventor: Klaus Plath, Mülsen (DE)

(73) Assignee: KKD GETRIEBEBAU UG, Weissach (DE)

( * ) Notice: Subject to any disclaimer, the term of this patent is extended or adjusted under 35 U.S.C. 154(b) by 0 days.

(21) Appl. No.: 16/225,647

(22) Filed: Dec. 19, 2018

(65) Prior Publication Data

US 2019/0154123 A1 May 23, 2019

Related U.S. Application Data

(63) Continuation of application No. PCT/IB2017/000864, filed on Jun. 21, 2017.

(51) Int. Cl.
*F16H 21/00* (2006.01)
*F16H 21/14* (2006.01)
*F16H 21/12* (2006.01)

(52) U.S. Cl.
CPC ............ *F16H 21/14* (2013.01); *F16H 21/12* (2013.01)

(58) Field of Classification Search
CPC ................................ F16H 21/14; F16H 21/12
See application file for complete search history.

(56) References Cited

U.S. PATENT DOCUMENTS

| 7,207,917 | B2 * | 4/2007 | Plath | ...................... | F16H 21/30 |
| | | | | | 475/331 |
| 2006/0264292 | A1 * | 11/2006 | Plath | ...................... | F16H 35/02 |
| | | | | | 475/162 |

FOREIGN PATENT DOCUMENTS

| EP | 0093305 A1 | 11/1983 |
| GB | 2219639 A | 12/1989 |
| WO | 2016083467 A1 | 6/2016 |

OTHER PUBLICATIONS

The Written Opinion dated Nov. 3, 2017 issued in corresponding PCT Appln. No. PCT/IB2017/000864.7, 6 pages (English translation included 4 pages).
The International Search Report dated Nov. 3, 2017 issued in corresponding PCT Appln. No. PCT/IB2017/000864.7, 3 pages (English translation included 2 pages).

* cited by examiner

*Primary Examiner* — Jake Cook
(74) *Attorney, Agent, or Firm* — Robert P. Michal, Esq.; Carter, DeLuca & Farrell LLP

(57) ABSTRACT

A device for power transmission includes a drive plate, a support plate, an output plate, a first main slide rail, a first drive train element, a first counterforce element, a first power transmission element, and a first output element, wherein the drive plate, support plate, and output plate are disposed above one another. The counterforce element generates a counterforce such that the total force from the driving force and the counterforce acting on the first main slide rail leads to a rotational movement of the support plate. The first power transmission element causes a rotational power transmission during rotational movement of the support plate and the first output element is connected to the output plate such that during the rotational movement of the support plate, an output power transmission connection exists from the moving part of the first main slide rail to the first output element.

15 Claims, 7 Drawing Sheets

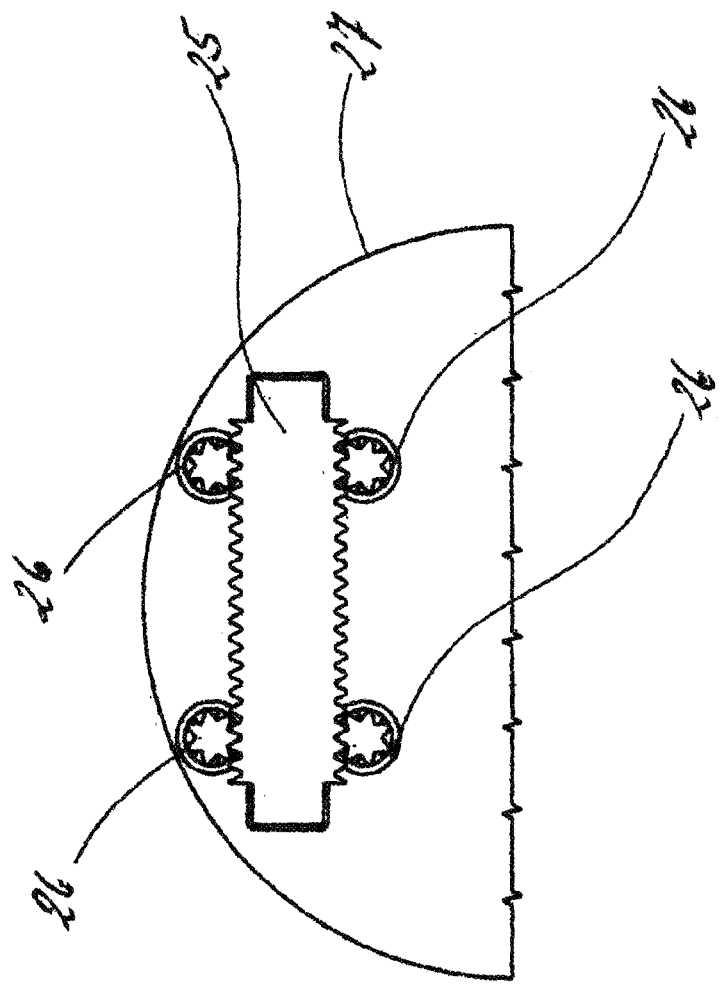

DEVICE FOR FORCE TRANSMISSION

CROSS-REFERENCE TO RELATED APPLICATION

This application is a Continuation of PCT International Patent Application No. PCT/IB2017/000864, filed on Jun. 21, 2017, which claims the benefit of German Patent Application No. 10 2016 111 342, filed on Jun. 21, 2016, and German Patent Application No. 10 2016 111 610, filed on Jun. 24, 2016, the entire disclosure of each of which is hereby incorporated by reference herein.

BACKGROUND

Technical Field

The present disclosure relates to a device for power transmission, and more particularly, to power transmission devices arranged between a drive device such as a bicycle, a planetary gear, an electric motor, a crank mechanism, etc. and a transmission such as manual transmissions of an automobile or a bicycle, or an output device for better power transmission.

Description of Related Art

Power transmission devices are commonplace in mechanical systems to control the transfer of power from a power source to an output device. However, conventional output devices typically have an uneven or unbalanced rotation as compared to the input device. As can be appreciated, these imbalances of the output device place stress and strain on the input device, which is undesirable and may shorten the life of various components in the mechanical system.

SUMMARY

An object of the disclosure is to provide a device for power transmission, which is versatile and provides good power transmission.

The device for power transmission provided in accordance with this disclosure includes a drive plate, a support plate and an output plate are provide, each of which has, in an area around its center, a rotatable mount with which they are rotatably mounted on a central axis one above the other. On the support plate is disposed a first main slide rail spaced apart the rotatable mount of the support plate, which has a fixed part that is integrated with the support plate and a moving part, which can be moved relative to the fixed part in the direction of the longitudinal axis of the first main slide rail. A first drive-traction element is provided, which is pivotably connected with a first end via a first drive train connecting element to the moving part of the first main slide rail and with a second end via a second drive train connecting element with the drive plate. A first counterforce element is arranged such that a counterforce on the moving part of the first main slide rail is generated as a specified drive force acting on the first drive train element via the first counterforce element, such that the total force ensuing from the drive force and the counterforce and acting on the first main slide rail comprises a component parallel and a component vertical to the longitudinal axis of the first main slide rail, which leads to a rotational movement of the support plate connected to the first main slide rail in a given direction of rotation. This total force thus acts obliquely to the longitudinal axis of the first main slide rail. Usually, a rotary movement in clockwise direction is desired. Accordingly, the direction of the total force is so chosen that a rotational movement of the support plate is in clockwise direction. In other words: The total force is selected as if it would cause the first main slide rail in a rotary movement about its center in the given direction of rotation. Since the first main slide rail is fixedly linked with its rigged part with the support plate, the total force causes a rotation of the support plate, with which the first main slide rail is moved along a circular path around the center of the support plate. Upon engagement of the drive force, the component of the total force being parallel to the longitudinal axis of the first main slide rail additionally causes a movement of the moving part of the first main slide rail in its longitudinal direction vis-à-vis the fixed part. This movement causes a further transmission of power to the support plate, which leads to a faster rotation of the support plate.

A first power transmission element is arranged on the support plate such that it causes a rotary-force transmitting link with the moving part of the first main slide rail for transmitting force on to the latter during rotational movement of the support plate. Owing to the rotation and displacement of the first main slide rail, the forces thus acting on the support plate forces are again transferred to the moving part of the first main slide rail. With a first output element, which is connected at a first end with the output plate and is disposed such that with the rotary movement of the support plate there exists an output power transmission link from the moving part of the first main slide rail onto the output plate, so that the force can be transmitted to the output plate. This has the further advantage that in the event of a defect, in the mounting of the first main slide rail the device generally continues to function only without a power transmission through the first power transmission element.

In embodiments, a bar-shaped element is used as drive train element, such as a flat material. It is contemplated that bolts can be used as fasteners.

It is envisioned that the first main slide rail is arranged symmetrically to a horizontal axis through the center of the support plate and a first transverse element is provided in a middle area of the moving part of the first main slide rail, the former protrudes transversely to the longitudinal axis of the first main slide rail over the first main slide rail, such that the first power transmission element abuts against the first transverse element with the rotational movement of the support plate. As the power transmission element a bolt can be used, which is mounted on the support plate at a suitably selected position. Thus, the power transmission can be done reliably and with simple construction. Depending on the arrangement of the main slide rail, the position of the force transmitting element can be appropriately selected on the support plate, so that power transmission can be ensured on the moving part of the slide rails.

As can be appreciated, the arrangement of the drive train element and the counterforce element is so chosen that the moving part of the main slide rail only executes a small movement in the longitudinal direction which is less than 5 cm, preferably less than $\frac{1}{100}$ mm.

According to one embodiment of the present disclosure, the first output element is arranged such that the transverse element moves against the first output plate during the rotational movement of the support plate. In embodiments the first output element is a bolt, which is mounted on the output plate. Said arrangement of the first force transmitting element and the first output element can be selected such that these can restrict the movement of the moving part of the first main slide rail in its longitudinal direction on one side. In this case, the first power transmission element during rotation should move through a circle having a larger diameter than the first output plate. Hereby is achieved that the forces support the rotational movement. An action of the forces against the predetermined direction of rotation, here in a clockwise direction, would not be desirable.

It is contemplated that the first output element is arranged such that it forms the first counterforce element simultaneously. The position of the first output element is suitably selected with respect to the protruding region of the first transverse element. In embodiments, the first output element is a bolt. Thanks to appropriate positioning of the first output element, an appropriate counterforce to the drive force can be generated. In order to determine the counterforce, a load on the output element is taken into account in this embodiment.

In embodiments, the first counterforce element is rotatably mounted with a first end via a first counterforce connection element at a given distance a to the first drive train element of the moving part of the first main slide rail and is rotatably connected on a second end via a second counterforce linking element to the output plate. The first and the second counterforce connection elements each may be configured as a bar-shaped element, viz. made of a flat material. As counterforce connection elements, it is contemplated that bolts can be used. The counterforce element acts as the output drive and thus constitutes the output element or an additional output element. It can be used as an only output element or together with a further output element and/or an output element configured differently.

In embodiments embodiment, the first main slide rail can be arranged above the center line of the support plate extending parallel to the first main slide rail, preferably in the upper third of the support plate, the first and second counterforce connection element are arranged such that the first counterforce element forms an acute angle with the first main slide rail. It is thus disposed between the first main slide rail and the center line. The first counterforce connection element thus describes a circular path, which is close to the circular path, which the first drive train element describes. Thus, the output can be made over a long lever arm of the first counter draw element, resulting in a particularly good power transmission.

It is contemplated that the first main slide rail is arranged symmetrically to an axis through the center of the support plate. The first drive train connecting-element is disposed at the first end of the first main slide rail and the first counterforce connection element at the second end of the first main slide rail, to which end at least a first counter draw element is rotatably mounted, wherein said first counter draw element forms an acute angle with the longitudinal axis of the first main slide rail. In embodiments, the first counter draw element can be the counterforce element, which is connected at its other end to the output plate. It is envisioned that a second or a further or another counter draw element may be provided, which has a greater angle to the longitudinal axis of the first main slide rail opposite the first counter draw element.

In embodiments, the first counter draw element is a mass element, which is formed in an essentially rod-shaped; the mass element with its first end is rotatably mounted, via the counterforce connection element, on the moving part of the main slide rail, and has, at its second end, a weight element that is arranged in a perpendicularly protruding fashion, opposite to the desired direction of movement of the support plate. The arrangement, such as length, angle to the main slide rails, arrangement of the weight element, are selected such that a further force acts on the moving part of the main slide rail due to the centrifugal force of the weight, which leads to a further acceleration of rotational movement of the support plate. With respect to the axis of the rod-shaped ground element the weight element is disposed opposite the predetermined direction of rotation. If the mass element is additionally disposed to a counterforce element, it can have a larger angle to the main slide rail than the counterforce element. In the arrangement of multiple counterforce elements, the respective angles to the main slide rail may be different and can be appropriately chosen for the particular arrangement. The mass element can also be arranged, via a right-angled connection element, on the counterforce connecting element of the main slide rail.

As can be appreciated, the rod-shaped portion of the mass element may be formed as a mass slide rail, wherein it's moving part is connected to the moving part of the main slide rail and the weight element is arranged on the moving part of the mass slide rail. The rigid part of the main slide rail may be fixedly or moveably mounted on the support plate. By using a slide rail, the additional power transmission and acceleration of the support plate in the direction of rotation is further reinforced. It is contemplated that the connection here as well is effected by a bolt and a corresponding mount or bearing, in particular a ball bearing.

In embodiments, a counter draw element an angle element is disposed with a first and a second rod-shaped leg, wherein the first and the second leg are flexibly connected with each other at an angle of approximately 90°, and the first leg is rotatably connected with its other end to the counterforce connection element and the second leg is flexibly connected to the support plate. By this means a further power transmission to the support plate and further acceleration can be achieved thereof. The connection takes place here as well preferably by a bolt and a corresponding mount, in particular a ball bearing.

It is contemplated that a ring element is spaced about the rotatable mount of the support plate, the counter draw element comprises a first and a second traction element, whereby the first traction element is connected at one end to the counterforce connection element of the first main slide rail, and at the second end to the ring element, and the first end of the second traction element is connected on the opposite side to the ring element. Thus, an arrangement is realized, in which the counter draw element can be disposed at an angle, which extends centrally through the support plate and simultaneously rotates about the central axis without hindering the mobility of the counter draw element. Alternatively, it is possible according to the present disclosure that the ring element is firmly connected with the central axis and that in the first and in the second traction element each a spring element is inserted, in order to ensure the movability of the counter draw element.

It is envisioned that the drive-traction element is rod-shaped and is arranged at one end of main slide rail such that it forms an acute angle with the first main slide rail. Thus, a particularly effective drive of the support plate can be achieved via the movement.

In embodiments, a second counter force element and a second power transmission element is disposed on the support plate symmetrical to a plane through the central axis, parallel to the first main slide rail, a second main slide rail is arranged, with a second drive traction element, for the purpose of rotating the support plate in the specified rotational direction. The second drive traction element may be connected to an additional or with the same drive plate. In embodiments, the same drive source is used, e.g. only one electric motor for both drives. With this symmetrical arrangement, the drive of the support plate can take place with only half of the drive force at each of the main slide rails, in comparison to the arrangement with only one main slide rail.

It is contemplated that a ring element is spaced about the rotatable mount. A first rod-shaped counter draw element is rotatably connected at one end to the first counterforce connection element of the first main slide rail and flexibly connected at the other end with the ring element and a second rod-shaped counter draw element is rotatably connected at one end with a second counterforce connector of the second main slide rail and flexibly linked at the other end to the ring element. If the annular element is firmly connected to the main axis, then spring elements are incorporated into the counter draw elements for ensuring flexibility. In this way, the two moving parts of the main slide rails are interconnected such that their movability is ensured and a common counter draw element can be used for both main slide rails. The arrangement of individual element in connection with the main slide rail can be provided accordingly in various embodiments for o the second main slide rail.

In embodiments, the moving part of the first main slide rail and second main slide rail each are designed as flat element, the fixed part of the respective main slide rail comprises wheel elements, which are rotatably mounted to the support plate and are arranged such that these work as a guide for the moving part of the respective main slide rail in longitudinal direction, whereby the wheel elements and the longitudinal sides of the flat element are provided with mutually corresponding guide elements. In embodiments, the moving part of the respective main slide rail on the one hand is well guided and that on the other hand, the moving part does not tilt and buckle with the rigged part due to the strong forces acting on the main slide rails. This is achieved by the fact that the wheel elements have as guide elements ball bearings and toothed gear rings and guide elements of the flat elements are provided with corresponding rolling surfaces and teeth. It can be used, for example, ball bearings and toothed gears superposed in the wheel elements, wherein the guide elements of the flat element have corresponding teeth and rolling surfaces.

It is contemplated that that for all of the mentioned rotatable mounts may use bolts and ball bearings, as mentioned with some rotatable mounts. The bolts and/or the mount of ball bearings can be made rubberized, as the movability of the individual components against one another is improved. This results in improved power transmission, since losses are reduced. This also prevents clattering noises during operation of the device.

PCT/EP2015077680 discloses a gear, especially a planetary gear, wherein the planet gear is moved by an eccentrically mounted drive, which has its own mounting axis fixed to a separate support. Thus, the drive has neither a fixed connection to the mounting axis nor to the planetary gear. The direction of the drive force is chosen diagonal to a hollow shaft rigidly connected to the planetary gear, and is realized by means of a correspondingly arranged traction device. Even for an output or for drives of such a gear, the described power transmission device can be advantageously used.

Further details, features and advantages of the present disclosure will become apparent from the following description of preferred embodiments with reference to the drawings.

BRIEF DESCRIPTION OF THE DRAWINGS

FIG. 7 shows a schematic representation of an embodiment of a main slide rail in plan view of a second section plane.

DETAILED DESCRIPTION

Figure 1:
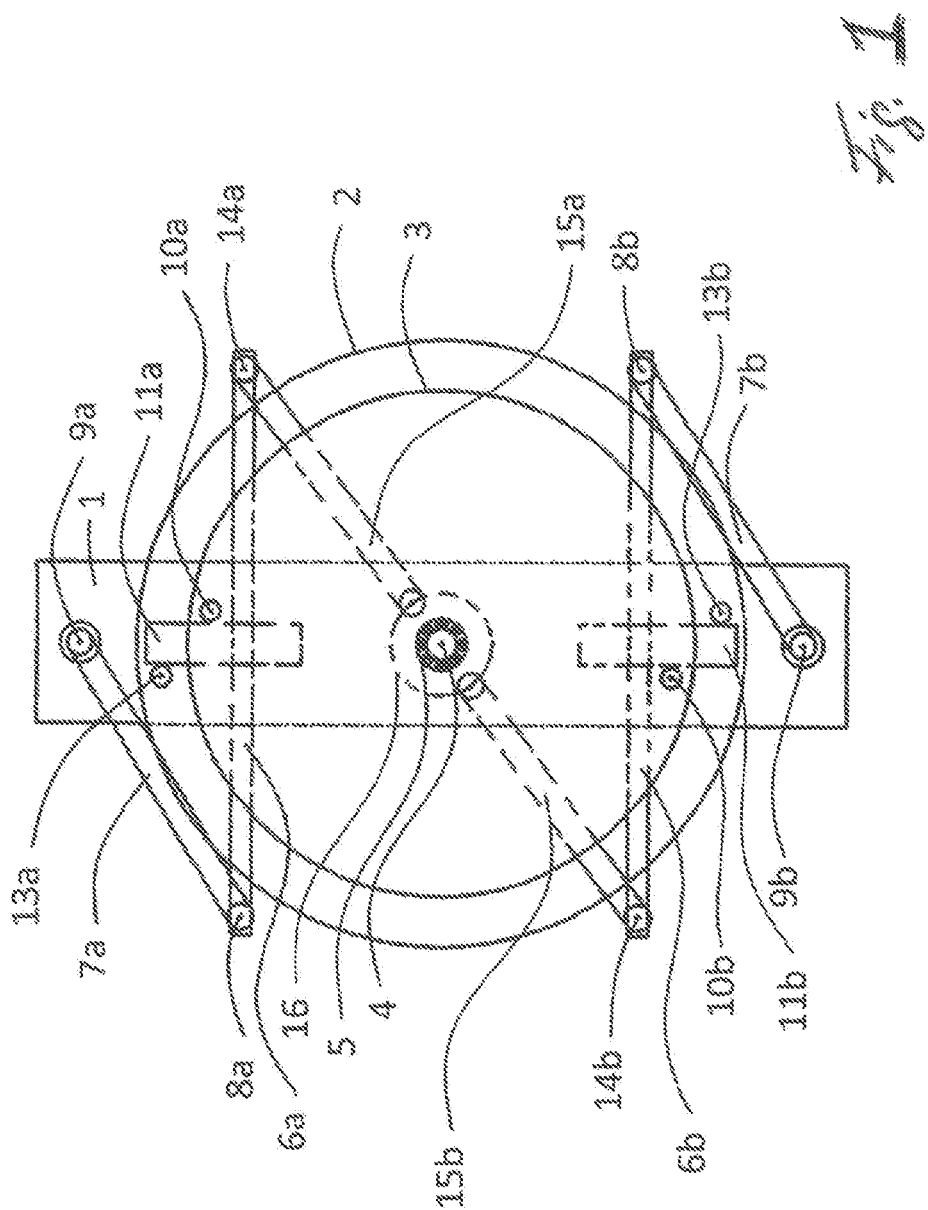
FIG. 1 shows a schematic representation of an embodiment of the disclosed device for power transmission in plan view.

FIG. 1 shows a device for power transmission according to the present disclosure, comprising a drive plate 1, a support plate 2 and an output plate 3, each having a rotatable mount in the area around its center, with which they are mounted rotatably around a central axis 4. In the illustrated embodiment, the drive plate 1 is located at the bottom, the support plate 2 in the middle and the output plate is arranged at the top. This sequence can be chosen differently as needed. The rotatable mount is designed in the embodiment, as shown, as a ball bearing, wherein the rotatable mount 5 of the upper plate, here the output plate 3, is visible. On the support plate 2, a first and a second main slide rail 6a, 6b are arranged spaced and symmetrical to the central axis 4. The first and the second main slide rails comprise a fixed part each, which is firmly connected with the support plate 2, and a moving part that can be moved against the fixed part towards the longitudinal axis of the respective main slide rail.

A first drive train element 7a is rotatably connected to the first end via a first drive-train connecting element 8a with the moving part of the first main slide rail 6a and via a second drive train connecting element 9a with the drive plate 1. For the first and second drive train connecting element 8a, 9a, and for all further connection elements for a rotatable connection in the power transmission device, bolts, preferably rubber studs with ball bearings or other suitable mounting can be used. In the case of drive of the drive plate 1 by means of an external source such as an electric motor, a drive force acts on the moving part of the first main slide rail, whose direction is defined by the direction of the drive train element and by the direction of rotation of drive plate 1, which is carried out here in a clockwise direction.

On the output plate 1, an output element 10a is arranged, which is designed here as a bolt, preferably gummed. In the middle area of the first main slide rail 6a, a transverse element 11a is connected with the moving part of the first main slide rail 6a such that it protrudes the first main slide rail 6a transversely to the longitudinal axis of the first main slide rail 6a. The transverse element 11a and the output element 10a are designed and arranged such that the transverse element 11a during a rotational movement of the support plate 2 strikes against the output plate 10a and thus transmits power to the output plate 3 and this is moved accordingly into the rotational movement. An output power transmission takes place through an output power-transmission connection from the moving part of the main slide rail 6a to output element 10a and to the drive plate 3. The output element 10a here acts simultaneously as a counterforce element to the drive train element 7a. The output element 10a is arranged such that a counterforce is generated on the moving part of the main slide rail 6a as a predetermined drive force acts on the drive train element 7a via the counterforce element, such that the total force resulting from the drive force and the counterforce and acting in a predetermined rotational direction on the main slide rail 6a comprises a component parallel as well as a component vertical to the longitudinal axis of the main slide rail 6a connected with the support plate 2.

On the support plate 2, a power transmission element 13a is arranged such that during rotational movement of the support plate 2, it causes an operating torque power-transmission connection to the moving part of the main slide rail 6a. The first power transmission element 13a is advantageously designed as a bolt, which is preferably rubberized. When the drive force moves the drive plate 1 in rotary motion in clockwise direction, a total force acts on the main slide rail 6a, whose component, perpendicular to the longitudinal axis of the first main slide rail 6a, would lead the first main slide rail in a rotating movement in clockwise direction about its center. Since the slide rail is firmly connected to the support plate 2 via its rigged part, this leads to a rotational movement of the support plate 2. Likewise the main slide rail 6a executes a rotational movement with the support plate 2, wherein the main slide rail 6a moves with its center along a circular path, spaced apart the central axis 4,. The component of the total force, which acts parallel to the longitudinal axis of the first main slide rail 6a, leads to a small movement of the moving part of the first main slide rail 6a with respect to the rigid part of the first main slide rail 6a. This leads to a faster rotational movement of the support plate 2. Thus, the first power transmission element 13a impacts the first cross element 11a, which is secured to the moving part of the first main slide rail 6a. This results in a lasting power transmission to the support plate 2 during rotational movement. Because of the arrangement with the first mail slide rail 6, the rotational movement of the support plate is supported and thus, the power transmission of the device is improved.

The first main slide rail 6a is arranged symmetrical to a horizontal axis through the center of the support plate 2. It is located in the upper third of the support plate 2 and/or in its edge region. Point-wise symmetrical to the center of the support plate 2, a second main slide rail 6b is arranged, a second drive-traction element 7b, a second output plate 10b, which acts as the counterforce element, a second transverse element 11b, as well as a second power transmission element 13b. The arrangement, selection and individual nature of these elements corresponds to those of the arrangement described above in connection with the first main slide rail 6a and therefore, will not be explained again. When using the first and the second slide rail each only transfers half of the drive force via the drive plate 3 compared to using only the first main slide rail 6a.

The first drive train connection-element 8a is disposed at the first end of the first main slide rail 6a and connected to the moving part of the main slide rail 6a. At the second end of the first main slide rail 6a, a first counter-draw connection element 14a is arranged and connected to the moving part of the main slide rail 6a. At the counter-draw connection element, a first rod-shaped counter draw element 15a is rotatably mounted. The first rod-shaped counter draw element 15a forms an acute angle with the longitudinal axis of the main slide rail 6a. The mounting can be done via a bolt and a ball bearing. The other end of the first counter draw element 15a is flexibly connected to a ring element 16, which is arranged spaced apart the rotatable mount of the support plate 2. A second rod-shaped counterforce element 15b is rotatably connected at one end with a second counter-draw connection element 14b of the second main slide rail 6b as well as with the other end it is flexibly connected to the ring element 16. Because they act on the moving part of the respective main slide rail 6a, 6b, the first and second rod-shaped counter draw element would further support the rotational movement of the support plate 2, so that the power transmission of the device is further improved.

Figure 2:
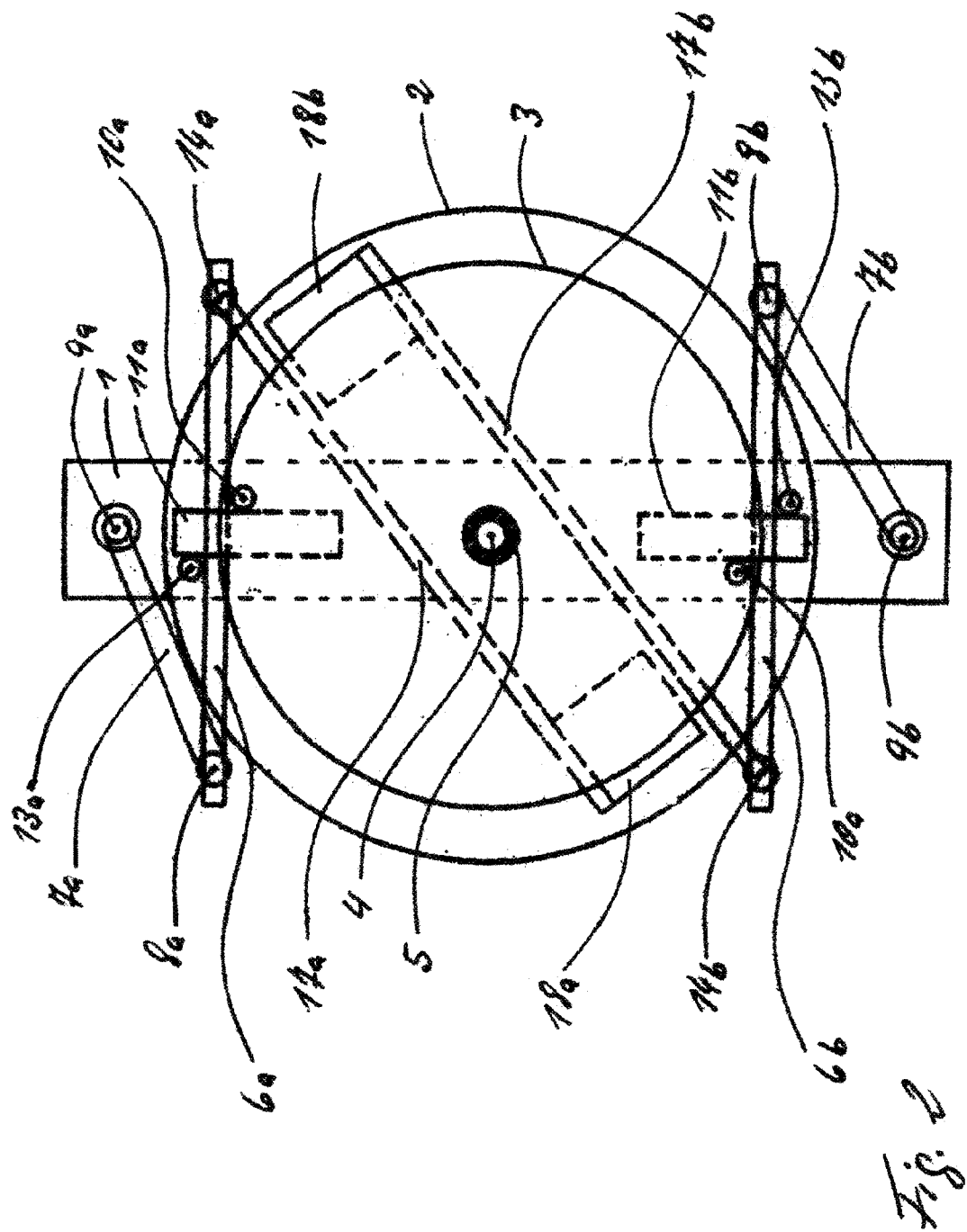
FIG. 2 shows a schematic representation of a further embodiment of said device for power transmission in plan view.

FIG. 2 shows a second embodiment of the device for power transmission. The layout of the device corresponds essentially to the layout of the device of FIG. 1. The same device features are designated with the same reference numerals as in the embodiment of FIG. 1. At the first counter draw connection element 14a of the first main slide rails 6a, a first mass element 17 is rotatably mounted, a second mass element 17b is rotatably mounted to the second counter-draw connection element 14b of the second main slide rail 6b. The first and second mass element 17a, 17b are each designed essentially rod-shaped and have, at the second end each, a vertically protruding first and second weight element 18a, 18b, arranged opposite the direction of movement of the support plate 2. Due to the first and second mass element 17a, 17b, a centrifugal force arises, which acts on the respective moving part of the first and second main slide rail 6a, 6b. This would provide support to the rotational movement of the support plate 2 and would bring about an improvement in power transmission of the device. The support to the rotary movement and power transmission can be influenced by the selected arrangement of the mass elements 17a, 17b. The latter can protrude on both sides across the rod-shaped region of the first and the second mass element 17a, 17b. The bar-shaped region of the first and second mass element 17a, 17b can be designed as mass slide rail. In doing so, the moving part of the first mass slide rail is connected with the moving part of the first main slide rail 6a and the moving part of the second mass slide rail with the moving part of the second main slide rail 6b.

Figure 3:
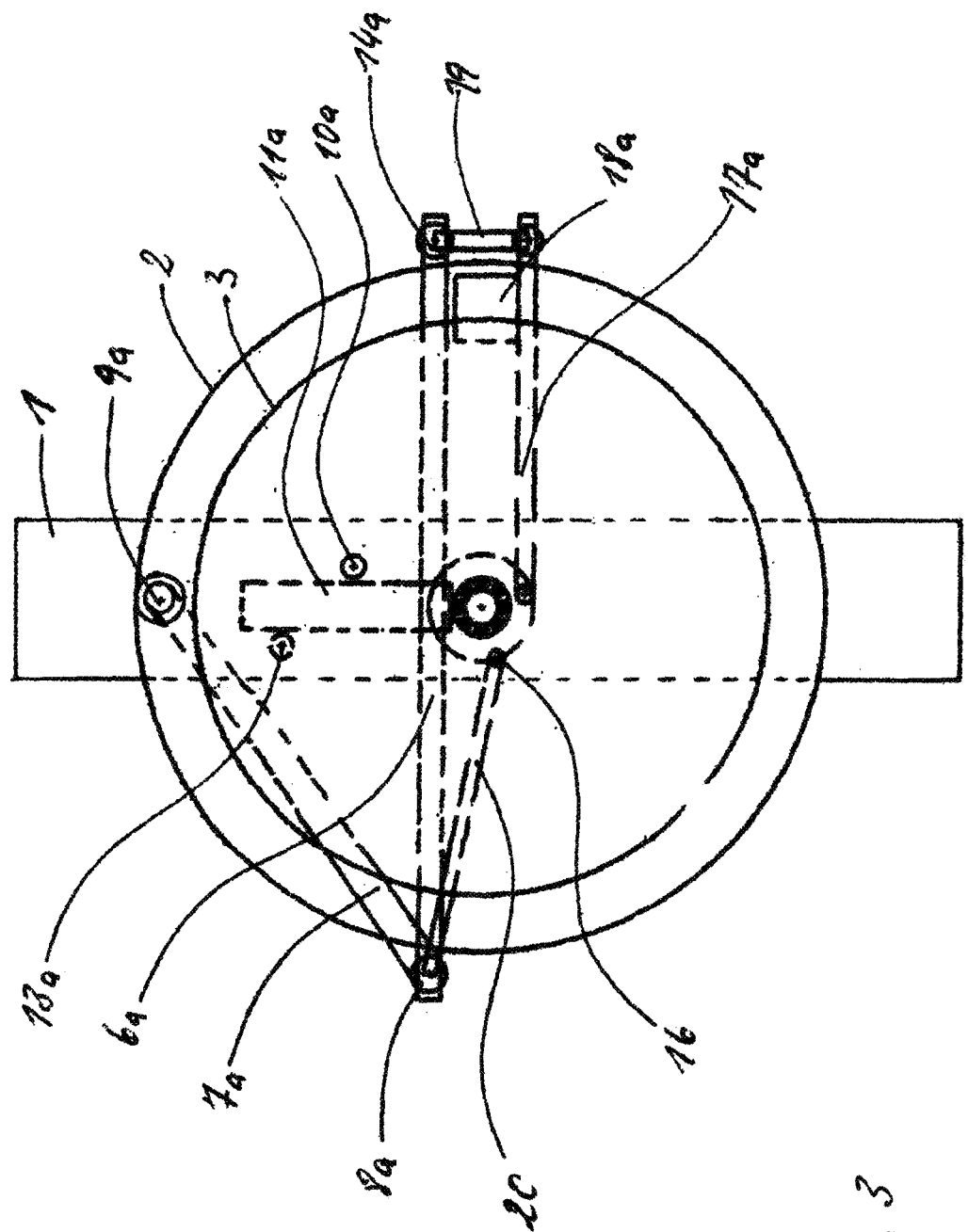
FIG. 3 shows a schematic representation of a further embodiment of said device for power transmission.

FIG. 3 shows an embodiment of the device for power transmission, wherein the first main slide rail 6a is arranged near the center point or close to the mount bearing of the support plate. The first drive traction element 7a, the first transverse element 11a, the first output element 10a, the first power transmission element 13a are suitably arranged corresponding to the arrangement of the first main slide rail 6a. The first mass element 17a is designed as mass slide rail, and arranged parallel to the first main slide rail 6a on the other side on a parallel plane through the center of the support plate 12. The first weight element 18a is secured in the edge region of the support plate 2 to the moving part of the mass slide rail, such that it points in the direction of the first main slide rail 6a, i.e. contrary to the direction of rotation. The first mass element 17a is connected with one end via a spacer 19 to the moving part of the first main slide rail 6a. The connection of the spacer 19 can be rotated on both sides. At the other end, the mass element 17 is flexibly connected to the free ring element 16, that is spaced surrounding the central axis 4. On the other side of the ring element 16 a bar element 20 is arranged, which is rotatably connected on one side to the ring element 16 and, to the first drive train connection element 8a on the other side, respectively. Due to the decentralized arrangement of the weight element 18, a lateral pressure arises during rotational movement on the first main slide rail 6a, which leads to a second inclined drive force on the first main slide rail 6a. By means of the bar element 20, a traction force is transmitted on the first main slide rail 6a, which is in turn transmitted from the first main slide rail 6a to the first output element 10a. Due to the small angle between the first main slide rail 6a and the bar element 20, a negligible counterforce occurs in the direction of the central axis 4.

Figure 4:
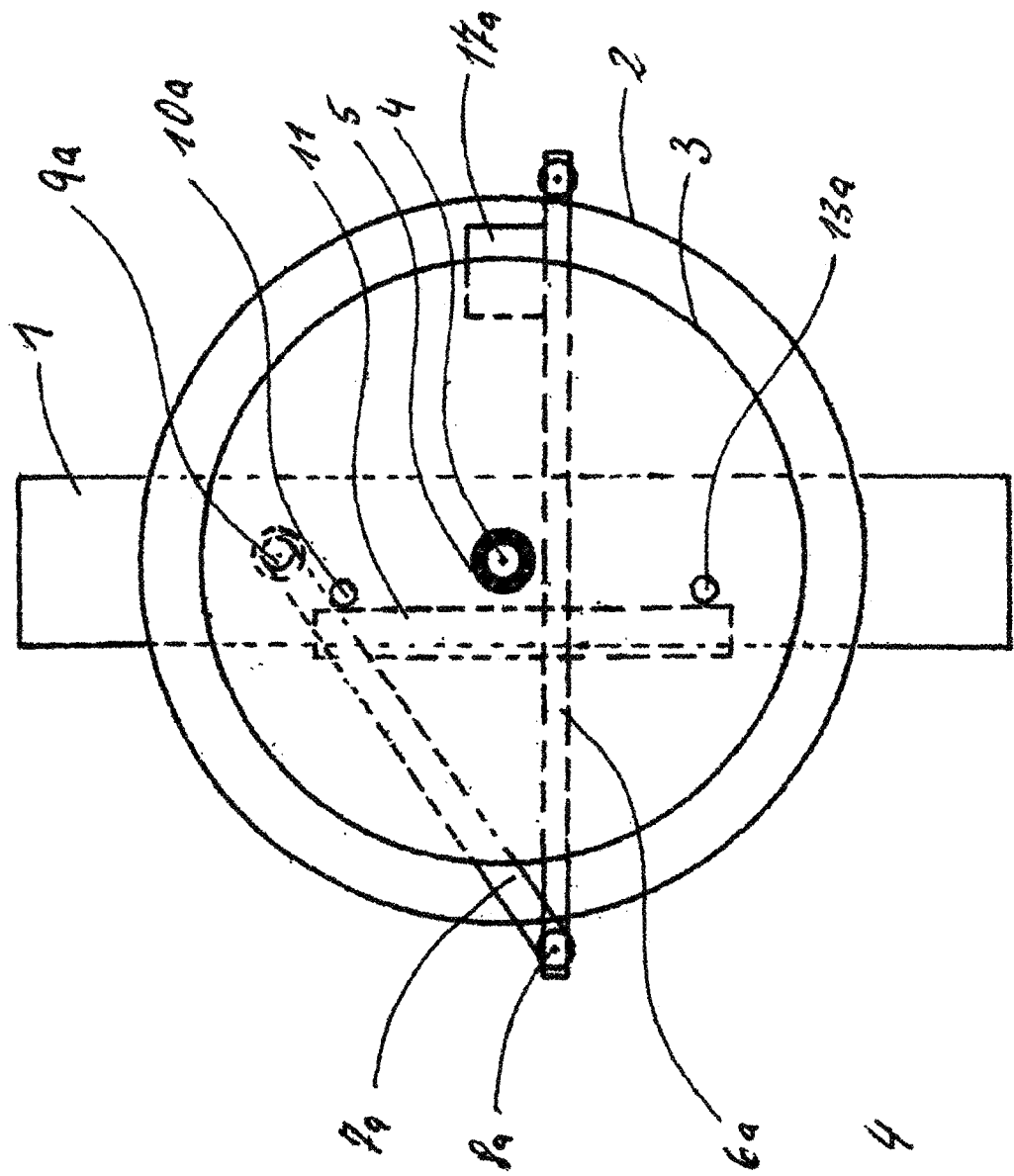
FIG. 4 shows is a schematic representation of a further embodiment of said device for power transmission.

FIG. 4 shows an embodiment of the power transmission device, in which the first main slide rail 6a is arranged on the support plate 2 in the horizontal plane of the support plate 2 below the central axis 4 and the rotatable mount of the support plate. The rotatable mount of the support plate is located on the central axis 4 below the rotatable mount 5 of the output plate 3, as visible in FIG. 4. This arrangement is advantageous, if the drive, for example, is executed by means of a planetary gear with a large hollow shaft, as described in PCT/EP2015077680, because sufficient space is available for arranging the hollow shaft in the upper area of the support plate. In this arrangement, the mass element 17 is sort of integrated in the first main slide rail 6a or identical to this. The weight element 17 is arranged on the moving part of the first main slide rail 6a, whereby the position of the weight element 18a on the support plate 2 is chosen corresponding to the position of the mass element 18a of FIG. 3. By the weight element 18a a lateral pressure is applied to the first main slide rail 6a, at the point at which the first counter-draw connection element 14a is located in the previous embodiments. Similar to the embodiment of FIG. 3, a power transmission takes place due to the weight element 18 on the moving part of the main slide rail 6a in its longitudinal direction, which is transmitted via the transverse element 11 to the output element 10a and thus to the output plate 3. So with this arrangement as well the rotational movement of the support plate 2 is supported and a better power transmission of the device is achieved.

Figure 5:
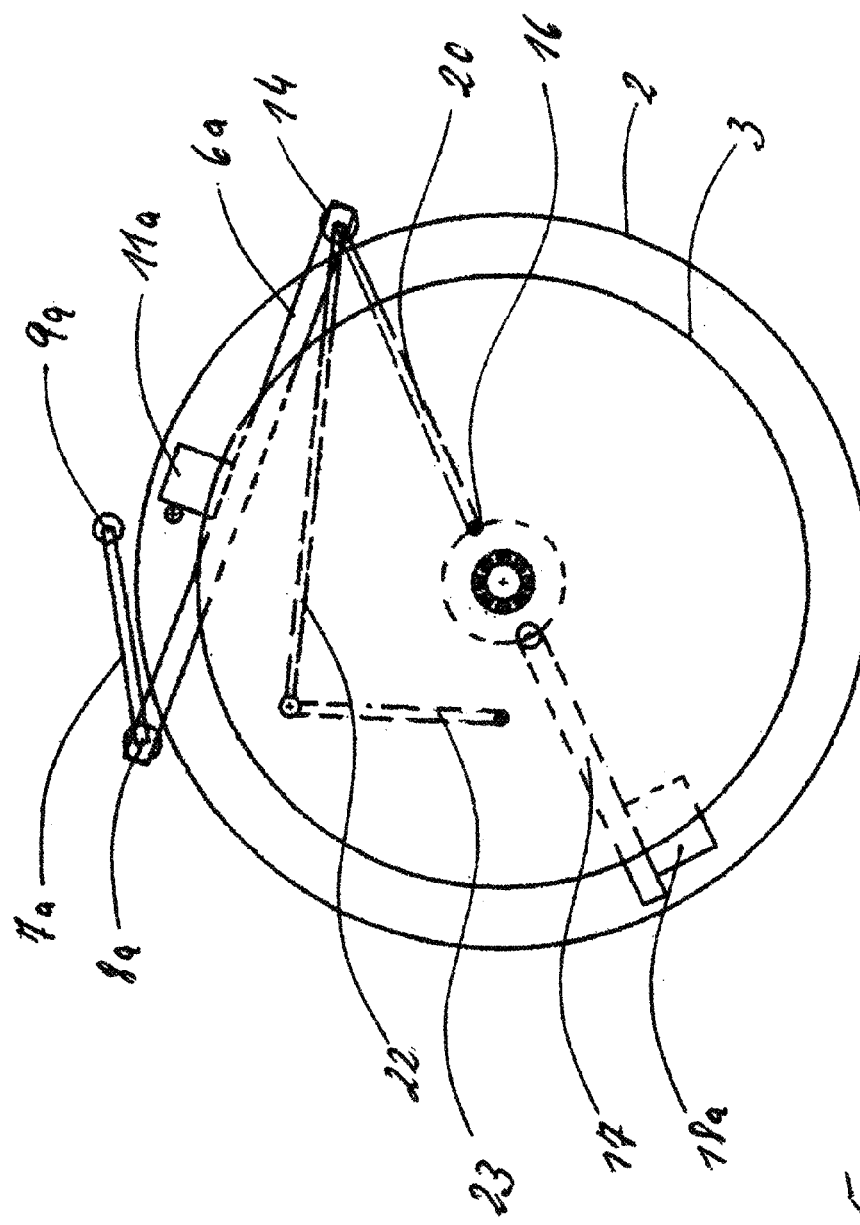
FIG. 5 shows a schematic representation of a further embodiment of the disclosed device for power transmission.

FIG. 5 shows an embodiment of the power transmission device, wherein the first main slide rail 6a is arranged in the edge region of the support plate 2. As in the other embodiments of the power transmission device, the first drive train element 7a is rotatably connected by means of the first drive-train connecting element 8a to the moving part of the first main slide rail 6a. At the second drive train connection element 9a, the bar element 20 is rotatably mounted at one end. The other end of the bar element 20 is rotatably connected to the ring element 16 that surrounds the central axis 4 and the rotatable mount of the support plate 2 in a spaced manner. On the opposite side of the ring element 16, the mass element 17 is rotatably mounted. At the other end of the mass element 17, the weight element 18 is arranged in a decentralized manner, here against the direction of rotation of the support plate 2. The bar element 20 and the ring element 16 form an extension of the mass element 17, through which a central alignment of the mass element 17 is facilitated, without that the central axis 4 would impair the movability of the mass element 17.

At the second drive train connecting element 9, an angle element 21 is additionally provided with a first and a second leg 22, 23 The first leg 22 and second leg 23 are flexibly interconnected at one end, wherein said angle is approximately 90°. The first leg 22 is rotatably supported at its other end to the counter-draw connection element 14. The second leg 22 can be flexibly connected to the support plate 2. The angle of the angled element 21 is so selected towards the longitudinal axis of the first main slide rail 6a that the angle element 21 is disposed in the upper half of the support plate 2, on which as well the first main slide rail is located. Using the angled element 21, an additional drive force is transmitted to the first main slide rails 6a, through which, in turn, the power transmission of the device is improved. With this arrangement, the output can take place via an output bolt at the junction of the first and the second leg 22, 23 of the angled element.

Within the scope of the present disclosure, further combinations are possible. Different types of counter draw elements can be combined. It is contemplated that they are arranged at different angles to the associated first or second main slide rail 6a, 6b. It is also possible that a part of the arrangement is provided on the back of the support plate 2. The location, selection and combination of individual components can, in accordance with construction requirements, be suitably selected as per the requirements of the power transmission conditions, respectively.

Figure 6:
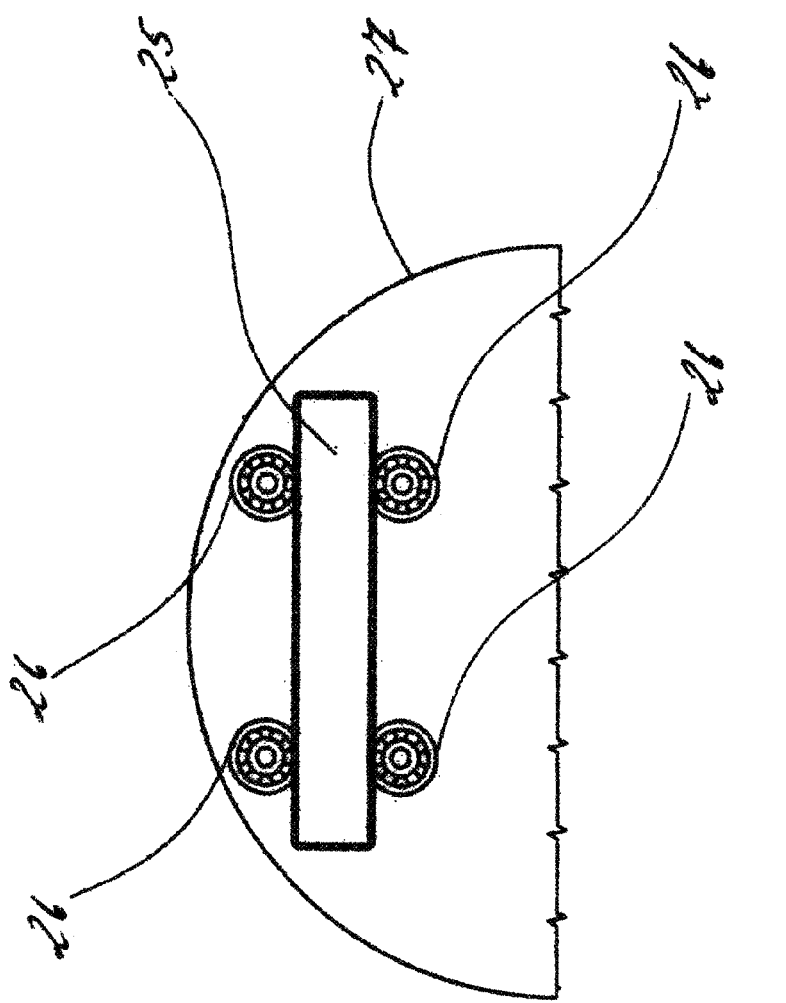
FIG. 6 shows a schematic representation of an embodiment of a main slide rail in plan view of a first section plane.

FIGS. 6 and 7 show an embodiment of the present disclosure for a slide rail, as used according to the present disclosure for the first and second main slide rails 6a, 6b or even for a mass slide rail, in two different planes parallel to the surface of plate 27, which can correspond to the support plate 2. The slide rail as shown comprises a first part 25 of a slide rail, which is formed from a flat material or the like and a second part 26, which is formed from individual wheel elements. Each of the wheel elements comprises a ball bearing and a sprocket. The second part 26 of the slide rail is firmly connected to the plate 27, as shown. For this, the individual wheels may be screwed onto the plate 27. The first part 25 of the slide rail can be moved against the rigged part 26. FIG. 6 shows a cross-sectional plane, in which the ball bearings of the wheel elements of the second part 25 of the slide rail are shown. In a movement of the first part 25 of the slide rail, the ball bearings run against the second part 26 of the slide rail with its rolling surface along a corresponding rolling surface of the first part 25 of the slide rail, which is formed on the longitudinal sides. FIG. 7 shows another plane, in which the sprockets are shown, which are arranged in a plane above the ball bearing. On the longitudinal sides of the first part 25 of the slide rail, teeth corresponding to the sprockets are formed, on which the sprockets run along during a movement of the first part 25 of the slide rail vis-à-vis the second part of the slide rail 26. A plurality of ball bearings or sprockets can be provided and also in a different arrangement of the wheel elements of the first part of the slide rail. Accordingly, the longitudinal sides of the second part 26 of the slide rail are formed with corresponding rolling surfaces or teeth. If according to the present disclosure, a slide rail, such as the mass slide rail, is not firmly connected to the support plate 2, the wheel elements are mounted on a separate suitable plate, which then can be moved with regard to the support plate 2.

LIST OF REFERENCE NUMERALS

1. Drive plate
2. Support plate
3. Output plate
4. Central axis
5. Rotatable mount of the output plate
6. Main slide rail
7. Drive train element
8. First drive train connecting element
9. Second drive train connecting element
10. Output element
11. Transverse element
12. Counterforce element 13. Power transmission element
14. Counter draw connecting element
15. Counter draw element
16. Ring element
17. Mass element
18. Weight element
19. Spacer
20. Web element
21. Angle element
22. First leg
23. Second leg
24. First part of the slide rail
25. Second part of the slide rail
26. Plate

What is claimed is:

1. A device for power transmission, comprising:
a drive plate;
a support plate;
an output plate, each of the drive plate, support plate, and output plate having, in a region around its center, a rotatable mount, with which each of the drive plate, support plate, and output plate are arranged rotatably on a central axis in a configuration such that each of the drive plate, support plate, and output plate are disposed one above the other;
a first main slide rail arranged on the support plate in spaced relation relative to the rotatable mount of the support plate, the first main slide rail having a rigid part, which is firmly connected to the support plate, and a moving part, which is movable relative to the rigid part in the direction of a longitudinal axis defined through the first main slide rail;
a first drive train element rotatably connected to the moving part of the first main slide rail at a first end by means of a first drive train connecting element and to the drive plate at a second end thereof by means of a second drive train connecting element;
a first counterforce element arranged such that in case of a predetermined driving force acting on the first drive train element, a counter force on the moving part of the first main slide rail is generated by means of the first counterforce element, such that the total force from the driving force and the counterforce acting on the first main slide rail exhibits both a parallel and a vertical component to the longitudinal axis of the first main slide rail, and leads to a rotational movement of the support plate connected to the first main slide rail in a predetermined direction of rotation;
a first power transmission element arranged on the support plate so as to cause a rotational power transmission connection on the moving part of the first main slide rail during the rotational movement of the support plate; and
a first output element that is connected with a first end to the output plate and is arranged such that during the rotational movement of the support plate an output power transmission connection exists from the moving part of the first main slide rail to the first output element.

2. The power transmission device according to claim 1, wherein the first main slide rail is arranged symmetrical to a horizontal axis defined through a center of the support plate, wherein a first transverse element is provided in a central region of the moving part of the first main slide rail, which protrudes transversely to the longitudinal axis of the first main slide rail over the first main slide rail, such that the power transmission element abuts against the transverse element during the rotational movement of the support plate.

3. The power transmission device according to claim 2, wherein the first output element is arranged such that the first transverse element abuts against the first output element during the rotational movement of the support plate.

4. The power transmission device according to claim 3, wherein the first output element is arranged such that it simultaneously forms the first counterforce element.

5. The power transmission device according to claim 1, wherein the first counterforce element is rotatably connected with a first end by means of a first counterforce connecting element at a predetermined distance from the first drive train element with the moving part of the first main slide rail and at a second end by means of a second counterforce connecting element to the output plate.

6. The power transmission device according to claim 1, wherein the first main slide rail is arranged symmetrical to an axis through the center of the support plate, the first drive train connecting element arranged at a first end of the first main slide rail and a first counter draw connecting element is disposed at the second end of the first main rail, at which at least a first counter draw member is rotatably mounted, wherein the first counter draw member forms an acute angle with the longitudinal axis of the first main slide rail.

7. The power transmission device according to claim 6, wherein the first counter draw element is a mass element, which is formed substantially as rod-shaped, with its first end rotatably mounted by means of the counter draw connecting element on the moving part of the main slide rail, and at its second end provides a vertically protruding first weight element arranged opposite to the desired direction of movement of the support plate.

8. The power transmission device according to claim 7, wherein the rod-shaped portion of the first mass member is formed as a mass slide rail, the moving part thereof being connected to the moving part of the main slide rail and the first weight member is arranged on the moving part of the mass slide rail.

9. The power transmission device according to claim 7, wherein an angle element with a first and a second rod-shaped leg is arranged as the counter draw element, wherein the first and the second leg are movably connected to one another at one end at an angle of approximately 90°, the first leg being rotatably connected at its other end to the first counter draw connecting element and the second leg being movably connected with the support plate.

10. The power transmission device according to claim 6, wherein a ring element is provided spaced around the rotatable mount of the support plate, the counter draw element comprises a first and a second train element, the first train element is attached at one end to the counter train-connecting element of the first main slide rail, at the second end to the ring member and the first end of the second train member opposite at the ring member.

11. The power transmission device according to claim 1, wherein the drive train member is rod-shaped and arranged at one end of the first main slide rail, so as to form an acute angle with the first main slide rail.

12. The power transmission device according to claim 1, wherein on the support plate a second main slide rail is arranged symmetrically to a plane through the central axis and parallel to the first main slide rail, with a second drive train element, a second counterforce element and a second power transmission element for rotation of the support plate in the predetermined direction of rotation.

13. The power transmission device according to claim 12, wherein a ring element is provided at a distance around the rotatable mount of the support plate, and a first rod-shaped counter draw element that at one end is rotatably mounted at the first counter draw connecting element of the first main slide rail and at the other end is movably connected to the ring member, and a second rod-shaped counter draw member that at one end is rotatably mounted to a second counter draw connecting member of the second main slide rail and at the other end is movably connected to the ring member.

14. The power transmission device according to claim 11, wherein the moving part of the first main slide rail is formed as a flat member, the rigid part of the first main slide rail comprises wheel members being rotatably mounted on the support plate and being arranged to ensure a guide of the moving part of the slide rail in the longitudinal direction, wherein the wheel elements and the longitudinal sides of the flat element are formed with mutually corresponding guide elements.

15. The power transmission device according to claim 14, wherein the wheel elements are provided with ball bearings and sprockets, which form the guide element and wherein the flat element has along its longitudinal sides corresponding rolling surfaces and teeth as guide elements.

* * * * *